(12) United States Patent
Burke et al.

(10) Patent No.: US 12,486,875 B2
(45) Date of Patent: Dec. 2, 2025

(54) ELECTROMAGNETIC SWITCHABLE CLUTCH

(71) Applicant: Schaeffler Technologies AG & Co. KG, Herzogenaurach (DE)

(72) Inventors: Peter Burke, Charlotte, NC (US); Michael Hodge, Wadsworth, OH (US); Brian Lee, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 2 days.

(21) Appl. No.: 18/588,165

(22) Filed: Feb. 27, 2024

(65) Prior Publication Data

US 2025/0060012 A1 Feb. 20, 2025

Related U.S. Application Data

(60) Provisional application No. 63/533,335, filed on Aug. 17, 2023.

(51) Int. Cl.
*F16D 11/14* (2006.01)
*F16D 27/112* (2006.01)
*F16D 41/04* (2006.01)
*F16D 41/12* (2006.01)
*F16D 41/16* (2006.01)
*F16D 11/00* (2006.01)
*F16D 121/20* (2012.01)

(52) U.S. Cl.
CPC ............ *F16D 27/112* (2013.01); *F16D 41/04* (2013.01); *F16D 41/125* (2013.01); *F16D 41/16* (2013.01); *F16D 2011/002* (2013.01); *F16D 2121/20* (2013.01)

(58) Field of Classification Search
CPC ... F16D 11/14; F16D 27/118; F16D 2011/002
See application file for complete search history.

(56) References Cited

U.S. PATENT DOCUMENTS 5,827,148 A * 10/1998 Seto ...................... B60W 10/04
74/336 R
11,661,979 B2 5/2023 Geiser et al.
(Continued)

FOREIGN PATENT DOCUMENTS

| JP | 2008202671 A | 9/2008 |
|----|--------------|--------|
| JP | 2017082822 A | 5/2017 |
| JP | 2017101762 A | 6/2017 |

*Primary Examiner* — Stacey A Fluhart (57) ABSTRACT

An electromagnetic switchable clutch includes a dog clutch, a one-way clutch and a coil assembly. The dog clutch includes a dog clutch hub with a first outer spline and first pockets, a dog clutch disc with a second outer spline and a dog clutch sleeve with an inner spline, complementary to the first outer spline and the second outer spline. The inner spline is drivingly engaged with the first outer spline and axially displaceable to engage the second outer spline. The one-way clutch includes a cam ring and pawls. The cam ring includes second pockets. The pawls are disposed the first pockets or the second pockets and arranged to engage the other of the first pockets or the second pockets to rotationally lock the cam ring to the dog clutch hub in a single rotational direction. The coil assembly is arranged to axially displace the dog clutch sleeve.

14 Claims, 4 Drawing Sheets

(56) References Cited

U.S. PATENT DOCUMENTS

| | | | |
|---|---|---|---|
| 11,713,789 B1* | 8/2023 | Geiser | F16D 41/12 |
| | | | 192/48.6 |
| 2016/0265602 A1* | 9/2016 | Pritchard | F16D 27/118 |
| 2022/0176813 A1* | 6/2022 | McBride | B60K 17/356 |
| 2022/0377164 A1* | 11/2022 | Wolfer | G06F 1/1632 |

* cited by examiner

ELECTROMAGNETIC SWITCHABLE CLUTCH

CROSS-REFERENCE TO RELATED APPLICATIONS

This application claims the benefit of U.S. Provisional Patent Application No. 63/533,335, filed Aug. 17, 2023, the disclosure of which is incorporated in its entirety by reference herein.

TECHNICAL FIELD

The present disclosure relates generally to a switchable clutch, and more specifically to an electromagnetic switchable clutch.

BACKGROUND

Switchable clutches are known. One example is shown and described in commonly-assigned U.S. Pat. No. 11,661,979 titled DOG CLUTCH WITH RATCHETING ONE-WAY CLUTCH to Geiser et al., hereby incorporated by reference as if set forth fully herein.

SUMMARY

Example aspects broadly comprise an electromagnetic switchable clutch including a dog clutch, a one-way clutch and a coil assembly. The dog clutch includes a dog clutch hub with a first outer spline and a plurality of first pockets, a dog clutch disc with a second outer spline and a dog clutch sleeve with an inner spline, complementary to the first outer spline and the second outer spline. The inner spline is drivingly engaged with the first outer spline and axially displaceable to engage the second outer spline. The one-way clutch includes a cam ring and a plurality of pawls. The cam ring is rotationally fixed to the dog clutch disc and includes a plurality of second pockets. The pawls are disposed in respective ones of one of the plurality of first pockets or the plurality of second pockets and arranged to engage the other one of the plurality of first pockets or the plurality of second pockets to rotationally lock the cam ring to the dog clutch hub in a single rotational direction. The coil assembly is arranged to axially displace the dog clutch sleeve.

In an example embodiment, the one-way clutch also includes a plurality of pawl springs arranged to pivot the plurality of pawls into engagement with the other one of the plurality of first pockets or the plurality of second pockets. In some example embodiments, the electromagnetic switchable also includes a detent arranged to retain the dog clutch sleeve in a first axial position assigned to a one-way clutch mode. In some example embodiments, the dog clutch sleeve has a first groove, the dog clutch hub has a second groove and the detent is a radially compressible ring disposed in the second groove and arranged to engage the first groove. In an example embodiment, the dog clutch sleeve has a third groove and the radially compressible ring is arranged to engage the third groove to retain the dog clutch sleeve in a second axial position assigned to a freewheel mode.

In an example embodiment, the coil assembly includes a first coil arranged to displace the dog clutch sleeve axially towards the dog clutch disc to engage the inner spline with the second outer spline in a dog clutch mode. In some example embodiments, the coil assembly includes a second coil arranged to displace the dog clutch sleeve axially away from the dog clutch disc to pivot the plurality of pawls in a freewheel mode. In some example embodiments, the one-way clutch also includes a cage with a ring portion arranged for pivoting the plurality of pawls and a radially-outwardly extending tab. The dog clutch sleeve has a radially-inwardly extending tab arranged to axially displace the radially-outwardly extending tab in a second axial position assigned to the freewheel mode. In an example embodiment, the dog clutch hub includes a notch and the radially-inwardly extending tab and the radially-outwardly extending tab are disposed in the notch.

In some example embodiments, the coil assembly includes a first cylindrical coil, a second cylindrical coil and a coil housing with an annular portion extending axially between the first cylindrical coil and the second cylindrical coil. In some example embodiments, the dog clutch sleeve includes an armature portion axially aligned with the coil assembly and the armature portion has a groove aligned with the annular portion. In an example embodiment, the coil housing includes a first end portion with a first conical face and a second end portion with a second conical face. The armature portion includes a third conical face disposed proximate the first conical face in a dog clutch mode and a fourth conical face disposed proximate the second conical face in a freewheel mode.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
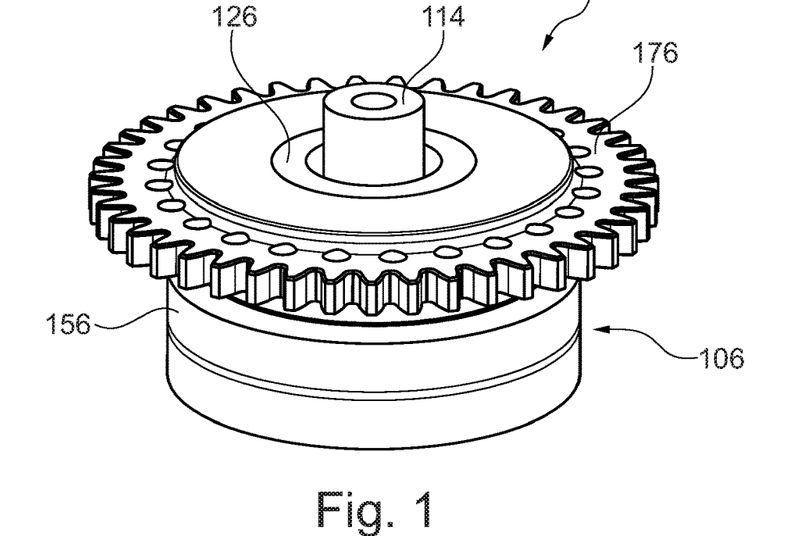
FIG. 1 illustrates a perspective view of an example embodiment of an electromagnetic switchable clutch according to an example aspect of the present disclosure.
Figure 2:
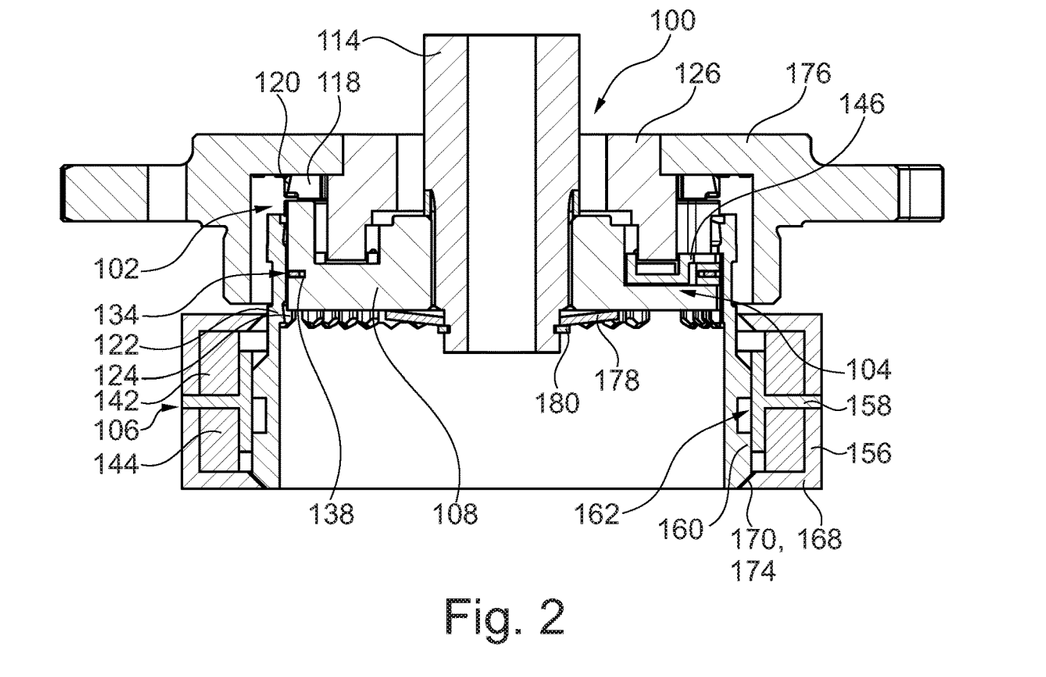
FIG. 2 illustrates a cross-sectional view of the electromagnetic switchable clutch of FIG. 1 shown in a freewheel mode.
Figure 3:
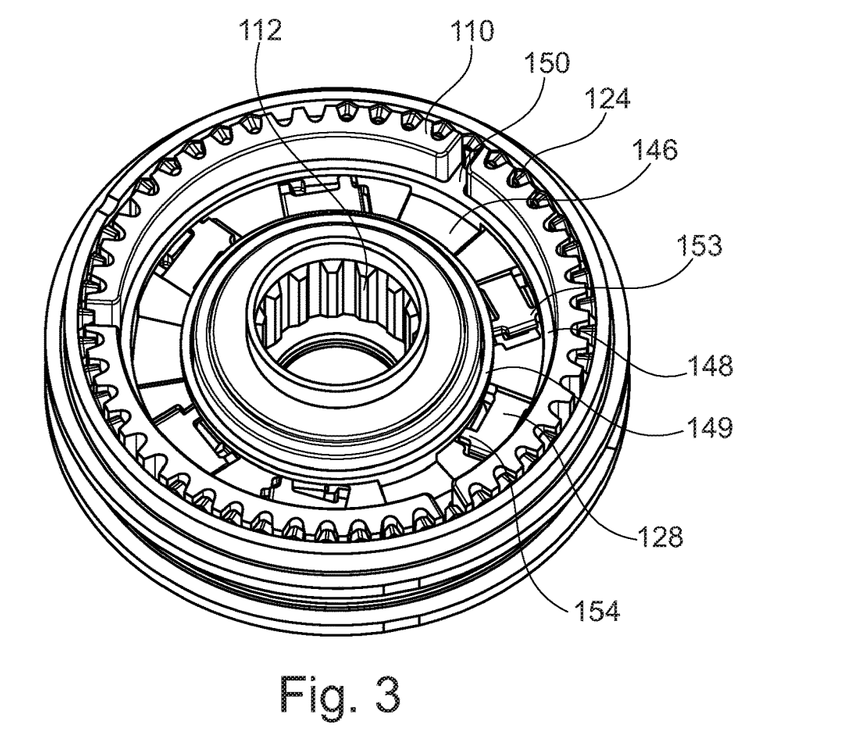
FIG. 3 illustrates a perspective view of the electromagnetic switchable clutch of FIG. 1 with components removed to show a portion of a one-way clutch.
Figure 4:
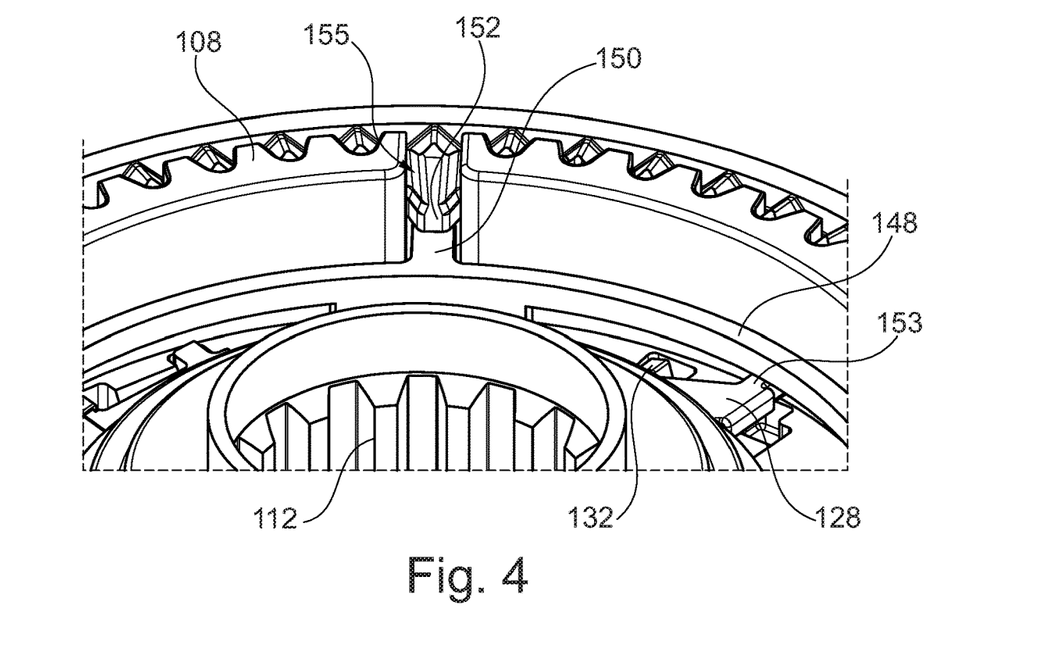
FIG. 4 illustrates a detail perspective of the portion of the one-way clutch of FIG. 3.
Figure 6:
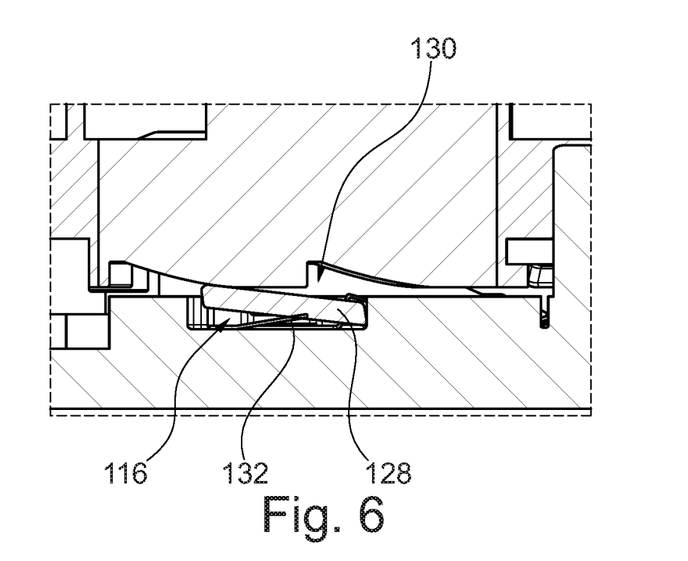
FIG. 6 illustrates a perspective sectional view of the electromagnetic switchable clutch of FIG. 1 with components removed to show a portion of a one-way clutch.

The following description is made with reference to FIGS. 1-4. FIG. 1 illustrates a perspective view of electromagnetic switchable clutch 100 according to an example aspect of the present disclosure. FIG. 2 illustrates a cross-sectional view of the electromagnetic switchable clutch of FIG. 1 shown in a freewheel mode. FIG. 3 illustrates a perspective view of the electromagnetic switchable clutch of FIG. 1 with components removed to show a portion of a one-way clutch. FIG. 4 illustrates a detail perspective of the portion of the one-way clutch of FIG. 3. Electromagnetic switchable clutch 100 includes dog clutch 102 one-way clutch 104 and coil assembly 106. Dog clutch 102 includes dog clutch hub 108 including outer spline 110, inner spline 112 arranged for driving connection with shaft 114, and pockets 116 (ref. FIG. 6). Dog clutch 102 also includes dog clutch disc 118 with outer spline 120 and dog clutch sleeve 122 with inner spline 124, complementary to splines 110 and 120. Inner spline 124 is drivingly engaged with outer spline 110 and axially displaceable to engage outer spline 120 as described in more detail below.

One-way clutch 104 includes cam ring 126 rotationally fixed to dog clutch disc 118 and pawls 128. Cam ring 126 includes pockets 130. Pawls 128 are disposed in pockets 116 and arranged to engage pockets 130 to rotationally lock the cam ring to the dog clutch hub in a single rotational direction. That is, when the electromagnetic switchable clutch is operating in a dog clutch mode, the cam ring and dog clutch hub are rotationally locked in a first rotational direction, but will freewheel in a second rotational direction, opposite the first rotational direction. Although the pawls are disposed in the dog clutch hub and engage the cam ring, other embodiments may include the pawls disposed in the cam ring and arranged to engage the dog clutch hub. General operation of the dog clutch and one-way clutch are similar to that shown and described in U.S. Pat. No. 11,661,979 incorporated by reference in the BACKGROUND section above. One-way clutch 104 also includes pawl springs 132 arranged to pivot the pawls into engagement with pockets 130.

Figure 5:
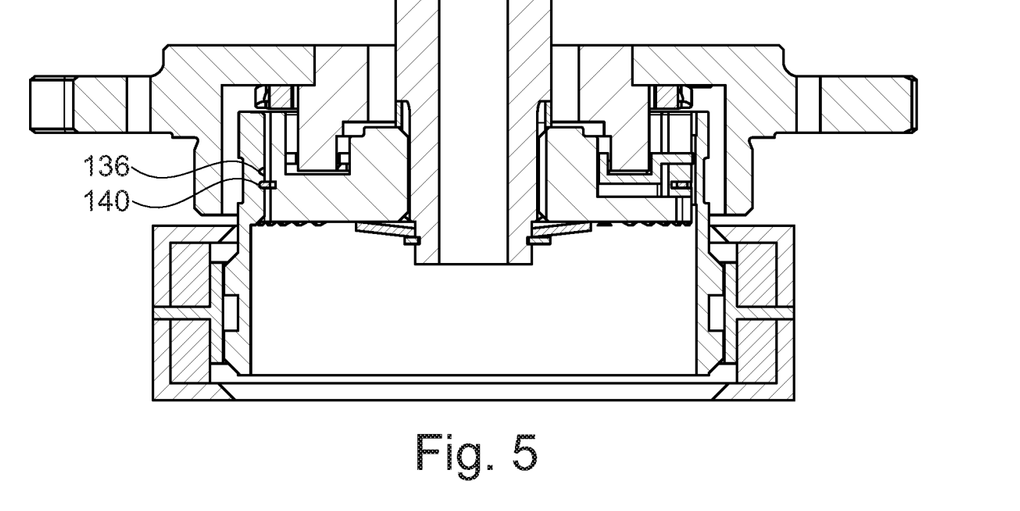
FIG. 5 illustrates a cross-sectional view of the electromagnetic switchable clutch of FIG. 1 shown in a one-way clutch mode.

Electromagnetic switchable clutch 100 also includes detent 134 arranged to retain the dog clutch sleeve in an axial position assigned to a one-way clutch mode. That is, the detent provides a minimal force that holds the dog clutch sleeve in a particular axial position absent external forces. Thus, as will be discussed below, when the detent is engaged with the dog clutch sleeve, coil assembly 106 may be de-energized but the electromagnetic switchable clutch will still be operating in the one-way clutch mode. Dog clutch sleeve 122 includes groove 136 (ref. FIG. 5), dog clutch hub 108 includes groove 138, and detent 134 is a radially compressible ring (e.g., a split ring) disposed in groove 138 and arranged to engage groove 136. Dog clutch sleeve 122 also includes groove 140 (ref. FIG. 5) and the radially compressible ring is arranged to engage groove 140 to retain the dog clutch sleeve in a second axial position assigned to a freewheel mode.

Coil assembly 106 includes coil 142 arranged to displace the dog clutch sleeve axially towards the dog clutch disc to engage inner spline 124 with outer spline 120 in a dog clutch mode, and coil 144 arranged to displace the dog clutch sleeve axially away from the dog clutch disc to pivot the pawls in a freewheel mode. One-way clutch 104 includes cage 146 with outer ring portion 148 and inner ring portion 149 arranged for pivoting the plurality of pawls, and radially-outwardly extending tab 150. Dog clutch sleeve 122 includes radially-inwardly extending tab 152 arranged to axially displace the radially-outwardly extending tab in a second axial position assigned to the freewheel mode. That is, when the second coil is energized, the dog clutch sleeve is axially displaced and tab 152 contacts tab 150, axially displacing ring portion 148 into cars 153 of the pawls and ring portion 149 into ears 154 of the pawls, overcoming a force of the pawl springs and flattening the pawls into pockets 116 so that the pawls cannot engage pockets 130 and the electromagnetic switchable clutch 100 freewheels in both directions. Dog clutch hub 108 includes notch 155 and tabs 150 and 152 are disposed in the notch.

Figure 7:
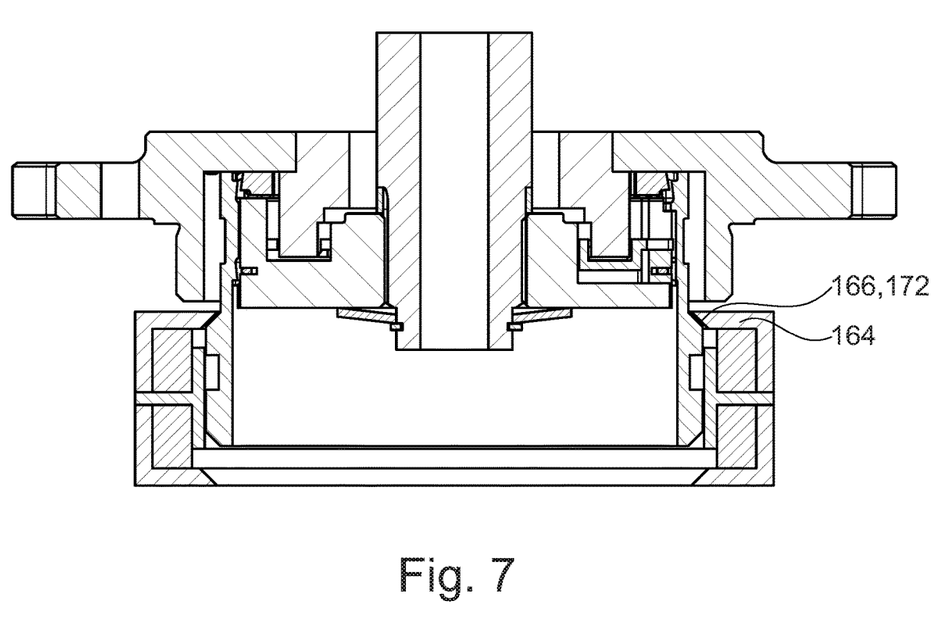
FIG. 7 illustrates a cross-sectional view of the electromagnetic switchable clutch of FIG. 1 shown in a dog clutch mode.

As discussed above, coil assembly 106 includes coils 142 and 144. Coils 142 and 144 are cylindrical coils. Coil assembly 106 also includes housing 156 with annular portion 158 extending axially between coils 142 and 144. Dog clutch sleeve 122 includes armature portion 160 axially aligned with the coil assembly. The armature portion includes groove 162 aligned with annular portion 158. Coil housing 156 also includes end portion 164 with conical face 166 (ref. FIG. 7) and end portion 168 with conical face 170. Armature portion 160 includes conical face 172 disposed proximate conical face 166 in a dog clutch mode (ref. FIG. 7) and conical face 174 disposed proximate the conical face 170 in a freewheel mode.

Electromagnetic switchable clutch 100 may be arranged in a powertrain of a vehicle. Clutch 100 may be fixed to drive gear 176, for example, to selectively transmit torque from shaft 114 to the drive gear. That is, torque from the shaft is passed to the dog clutch hub through spline 112. Diaphragm spring 178 and snap ring 180 retain the dog clutch hub on the shaft. Depending on a mode of operation, the dog clutch hub may transmit torque in both rotational directions through the dog clutch in the dog clutch mode, torque in only a single rotational direction through the one-way clutch in the one-way clutch mode, or in neither rotational direction when the one-way clutch is disengaged in the freewheel mode. Coil assembly 106 shifts the electromagnetic switchable clutch between modes as described below.

The following description is made with reference to FIGS. 1-7. FIG. 5 illustrates a cross-sectional view of the electromagnetic switchable clutch of FIG. 1 shown in a one-way clutch mode. FIG. 6 illustrates a perspective sectional view of the electromagnetic switchable clutch of FIG. 1 with components removed to show a portion of a one-way clutch. FIG. 7 illustrates a cross-sectional view of the electromagnetic switchable clutch of FIG. 1 shown in a dog clutch mode.

FIG. 2 depicts freewheel mode. Freewheel mode is engaged when coil 144 is energized, pulling the armature downward as shown in the figure. This moves the dog clutch sleeve downward as well, displacing the cage and pawls so that the dog clutch hub and the one-way clutch cam ring are free to rotate relative to one another and no torque is transmitted between the shaft and drive gear. The detent ring is engaged with groove 140 so that, when coil 144 is de-energized, clutch 100 will remain in a freewheel mode.

FIG. 5 depicts one-way clutch mode. When coil 142 is engaged, the dog clutch sleeve displaces the detent out of groove 140 and moves towards a middle position. It should be noted that fully energizing only coil 142 would move the dog clutch sleeve in dog clutch mode (described below), so coil 142 may be only partially energized so that the sleeve stops when the detent enters groove 138, or both coils may be partially energized to balance movement of the armature and the dog clutch sleeve. When the sleeve is in the middle position, the sleeve releases force on the cage and the pawl springs urge the pawls into pockets 120. Therefore, in one rotational direction, the dog clutch hub is locked to the cam ring and torque is transmitted between the shaft and final drive gear, and in the other rotational direction, the pawls are pushed down by the cam ring and no torque is transmitted. During torque transmission, torque is transmitted from the shaft to the dog clutch hub, through the pawls into the cam ring, and from the cam ring to the final drive gear. The cam ring may be press-fit, welded, or splined to the final drive gear to facilitate torque transmission. As with freewheel mode, the detent keeps the clutch in this mode when the coils are de-energized.

FIG. 7 depicts dog-clutch mode. When coil 142 is fully energized, the dog clutch sleeve displaces the detent out of groove 138 and moves towards the dog clutch disc. Inner splines of the dog clutch sleeve (already engaged with the outer splines of the dog clutch hub) engage with the dog clutch disc, transmitting torque from the shaft to the drive gear. It should be noted that, splines 110 and 120 are designed such that they are aligned when the one-way clutch is locked. Therefore, the dog clutch sleeve can engage the dog clutch disc without the synchronization clutch used in many dog clutch applications. Dog clutch 102 operates in both rotational directions when engaged so torque is always transferred from the shaft to the drive gear (and vice versa) in both rotational directions. During torque transmission, torque is transmitted from the shaft to the dog clutch hub, through the dog clutch sleeve to the dog clutch disc, and through the cam ring to the final drive gear. The dog clutch disc is rotationally fixed to the cam ring (e.g., via a spline or other rotationally fixed connection) to facilitate torque transmission. The dog clutch disc may be axially fixed in the electromagnetic switchable clutch by the final drive gear on one side and the dog clutch hub on the other side.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, case of assembly, etc. As such, to the extent any embodiments are described as less desirable than other embodiments or prior art implementations with respect to one or more characteristics, these embodiments are not outside the scope of the disclosure and can be desirable for particular applications.

REFERENCE NUMERALS

100 Electromagnetic switchable clutch
102 Dog clutch
104 One-way clutch
106 Coil assembly
108 Dog clutch hub
110 Outer spline (first, dog clutch hub)
112 Inner spline (dog clutch hub)
114 Shaft
116 Pockets (first, dog clutch hub)
118 Dog clutch disc
120 Outer spline (second, dog clutch disc)
122 Dog clutch sleeve
124 Inner spline (dog clutch sleeve)
126 Cam ring
128 Pawls
130 Pockets (second, cam ring)
132 Pawl springs
134 Detent
136 Groove (first, dog clutch sleeve)
138 Groove (second, dog clutch hub)
140 Groove (third, dog clutch sleeve)
142 Coil (first)
144 Coil (second)
146 Cage
148 Outer ring portion (cage)
149 Inner ring portion (cage)
150 Radially-outwardly extending tab (cage)
152 Radially-inwardly extending tab (dog clutch sleeve)
153 Ears (pawls)
154 Ears (pawls)
155 Notch (dog clutch hub)
156 Housing (coil assembly)
158 Annular portion (housing)
160 Armature portion (dog clutch sleeve)
162 Groove (armature portion)
164 End portion (first, housing)
166 Conical face (first, first end portion)
168 End portion (second, housing)
170 Conical face (second, second end portion)
172 Conical face (third, armature portion)
174 Conical fact (fourth, armature portion)
176 Drive gear
178 Diaphragm spring
180 Snap ring

What is claimed is:

1. An electromagnetic switchable clutch, comprising:
    a dog clutch comprising:
        a dog clutch hub comprising:
            a first outer spline; and
            a plurality of first pockets;
        a dog clutch disc comprising a second outer spline; and
        a dog clutch sleeve comprising an inner spline, complementary to the first outer spline and the second outer spline, the inner spline drivingly engaged with the first outer spline and axially displaceable to engage the second outer spline;
    a one-way clutch comprising:

a cam ring rotationally fixed to the dog clutch disc and comprising a plurality of second pockets; and a plurality of pawls disposed in respective ones of one of the plurality of first pockets or the plurality of second pockets and arranged to engage the other one of the plurality of first pockets or the plurality of second pockets to rotationally lock the cam ring to the dog clutch hub in a single rotational direction;

a coil assembly arranged to axially displace the dog clutch sleeve; and a detent arranged to retain the dog clutch sleeve in a first axial position assigned to a one-way clutch mode.

2. The electromagnetic switchable clutch of claim 1 wherein the one-way clutch further comprises a plurality of pawl springs arranged to pivot the plurality of pawls into engagement with the other one of the plurality of first pockets or the plurality of second pockets.

3. The electromagnetic switchable clutch of claim 1 wherein:
the dog clutch sleeve comprises a first groove;
the dog clutch hub comprises a second groove; and
the detent is a radially compressible ring disposed in the second groove and arranged to engage the first groove.

4. The electromagnetic switchable clutch of claim 3 wherein:
the dog clutch sleeve comprises a third groove; and
the radially compressible ring is arranged to engage the third groove to retain the dog clutch sleeve in a second axial position assigned to a freewheel mode.

5. The electromagnetic switchable clutch of claim 1 wherein:
the coil assembly comprises a first coil arranged to displace the dog clutch sleeve axially towards the dog clutch disc to engage the inner spline with the second outer spline in a dog clutch mode.

6. The electromagnetic switchable clutch of claim 1 wherein:
the coil assembly comprises a second coil arranged to displace the dog clutch sleeve axially away from the dog clutch disc to pivot the plurality of pawls in a freewheel mode.

7. The electromagnetic switchable clutch of claim 6 wherein:
the one-way clutch further comprises a cage, the cage comprising:
a ring portion arranged for pivoting the plurality of pawls; and
a radially-outwardly extending tab; and
the dog clutch sleeve comprises a radially-inwardly extending tab arranged to axially displace the radially-outwardly extending tab in a second axial position assigned to the freewheel mode.

8. The electromagnetic switchable clutch of claim 7 wherein:
the dog clutch hub comprises a notch; and
the radially-inwardly extending tab and the radially-outwardly extending tab are disposed in the notch.

9. The electromagnetic switchable clutch of claim 1 wherein the coil assembly comprises:
a first cylindrical coil;
a second cylindrical coil; and
a coil housing comprising an annular portion extending axially between the first cylindrical coil and the second cylindrical coil.

10. The electromagnetic switchable clutch of claim 9 wherein:

the dog clutch sleeve comprises an armature portion axially aligned with the coil assembly; and
the armature portion comprises a groove aligned with the annular portion.

11. The electromagnetic switchable clutch of claim 10 wherein:
the coil housing comprises:
a first end portion comprising a first conical face; and
a second end portion comprising a second conical face; and
the armature portion comprises:
a third conical face disposed proximate the first conical face in a dog clutch mode; and
a fourth conical face disposed proximate the second conical face in a freewheel mode.

12. An electromagnetic switchable clutch, comprising:
a dog clutch comprising:
a dog clutch hub comprising:
a first outer spline; and
a plurality of first pockets;
a dog clutch disc comprising a second outer spline; and
a dog clutch sleeve comprising:
an inner spline, complementary to the first outer spline and the second outer spline, the inner spline drivingly engaged with the first outer spline and axially displaceable to engage the second outer spline; and
a radially-inwardly extending tab;
a one-way clutch comprising:
a cam ring rotationally fixed to the dog clutch disc and comprising a plurality of second pockets;
a plurality of pawls disposed in respective ones of one of the plurality of first pockets or the plurality of second pockets and arranged to engage the other one of the plurality of first pockets or the plurality of second pockets to rotationally lock the cam ring to the dog clutch hub in a single rotational direction; and
a cage comprising:
a ring portion arranged for pivoting the plurality of pawls; and
a radially-outwardly extending tab; and
a coil assembly arranged to axially displace the dog clutch sleeve, the coil assembly comprising a coil arranged to displace the dog clutch sleeve axially away from the dog clutch disc to pivot the plurality of pawls in a freewheel mode, wherein the radially-inwardly extending tab is arranged to axially displace the radially-outwardly extending tab in a second axial position assigned to the freewheel mode.

13. The electromagnetic switchable clutch of claim 12 wherein:
the dog clutch hub comprises a notch; and
the radially-inwardly extending tab and the radially-outwardly extending tab are disposed in the notch.

14. An electromagnetic switchable clutch, comprising:
a dog clutch comprising:
a dog clutch hub comprising:
a first outer spline; and
a plurality of first pockets;
a dog clutch disc comprising a second outer spline; and
a dog clutch sleeve comprising:
an inner spline, complementary to the first outer spline and the second outer spline, the inner spline drivingly engaged with the first outer spline and axially displaceable to engage the second outer spline; and an armature portion comprising a groove;
a one-way clutch comprising:
  a cam ring rotationally fixed to the dog clutch disc and comprising a plurality of second pockets;
  a plurality of pawls disposed in respective ones of one of the plurality of first pockets or the plurality of second pockets and arranged to engage the other one of the plurality of first pockets or the plurality of second pockets to rotationally lock the cam ring to the dog clutch hub in a single rotational direction; and
a coil assembly, axially aligned with the armature portion and arranged to axially displace the dog clutch sleeve, the coil assembly comprising:
  a first cylindrical coil;
  a second cylindrical coil; and
  a coil housing comprising:
    an annular portion, aligned with the groove and extending axially between the first cylindrical coil and the second cylindrical coil;
    a first end portion comprising a first conical face; and
    a second end portion comprising a second conical face, wherein the armature portion further comprises:
  a third conical face disposed proximate the first conical face in a dog clutch mode; and
  a fourth conical face disposed proximate the second conical face in a freewheel mode.

* * * * *